United States Patent [19]

Carpenter et al.

[11] 4,361,592
[45] Nov. 30, 1982

[54] DRY INSTANT PUDDING MIX

[75] Inventors: John R. Carpenter; Robert R. Cassanelli; Frank J. Markert, all of Dover, Del.

[73] Assignee: General Foods Corporation, White Plains, N.Y.

[21] Appl. No.: 231,194

[22] Filed: Feb. 4, 1981

[51] Int. Cl.³ .................... A23L 1/187; A23L 1/195
[52] U.S. Cl. .................................... 426/579; 426/661
[58] Field of Search .................... 426/578, 579, 661

[56] References Cited

U.S. PATENT DOCUMENTS

| | | | |
|---|---|---|---|
| 2,257,599 | 9/1941 | Frischmuth et al. | 426/579 |
| 2,554,143 | 5/1951 | Hinz et al. | 426/579 |
| 2,613,150 | 10/1952 | Halden | 426/579 |
| 2,801,924 | 8/1957 | Clausi | 426/579 |
| 3,326,696 | 6/1967 | Deckop | 426/579 |
| 3,539,358 | 11/1970 | Hing | 426/579 |
| 3,582,350 | 6/1971 | Werbin et al. | 426/579 |
| 3,914,456 | 10/1975 | Norsby | 426/579 |
| 3,934,049 | 1/1976 | Lauck | 426/579 |
| 4,006,262 | 2/1977 | Smith | 426/579 |

*Primary Examiner*—Jeanette M. Hunter
*Attorney, Agent, or Firm*—Thomas R. Savoie; Walter Scott; Daniel J. Donovan

[57] ABSTRACT

An improved dry instant pudding mix which upon hydration yields a pudding with an improved texture and appearance is prepared by incorporating a fine grind starch and a powdered sugar of a controlled particle size.

5 Claims, No Drawings

DRY INSTANT PUDDING MIX

BACKGROUND OF INVENTION

The trend in recent years has been towards convenience in food preparation. In line with such convenience products such as instant puddings are desirable, i.e. a pudding that can be prepared without cooking by simply mixing a dry pudding mix with milk. While instant pudding products have met with consumer acceptance there is still a need perceived for an improved and optimum pudding texture and appearance that is creamier, glossier and smoother upon mixing the dry mix with milk and which closely resembles the texture and appearance of cooked pudding.

U.S. Pat. No. 4,006,262 by Smith et al discloses a critical particle size of the orthophosphate and sugar to allow for simple hand stirring of the dry mix with milk and to obtain an enhanced creaminess and smoothness in the resultant pudding. However, a further improvement in obtaining a smooth, glossy and creamy texture is still desired.

Thus it is an object of this invention to provide an instant pudding mix which upon mixing with milk results in a pudding with optimum and improved creamy, glossy and smooth texture and appearance as is characteristic of cooked puddings.

SUMMARY

Briefly, the present invention involves preparing a dry instant pudding mix based upon starch in which the particle size of the starch and sugar is critically controlled to provide enhanced and optimum texture and appearance characteristics. A pregelatinized starch is incorporated in the dry instant pudding mix which has a particle size wherein a maximum of 1% by weight of the starch is retained on a 230 mesh U.S. Standard screen and at least a majority by weight of the starch particles pass through a 400 mesh U.S. Standard screen. A powdered sugar is also incorporated into the dry instant pudding mix at a level of 5 to 60% by weight of the total sugar. This powdered sugar has a particle size wherein at least 90% by weight of the sugar particles pass through a 200 mesh U.S. Standard screen. The amounts of starch and sugar, as well as other common ingredients of instant pudding mixes, such as setting agents and flavoring agents, are incorporated at levels common in the art.

DETAILED DESCRIPTION OF THE INVENTION

A starch based dry instant pudding mix having upon hydration an improved glossy, smooth and creamy texture and appearance is prepared by incorporating a pregelatinized starch and a sugar of a controlled critical particle size. By critically controlling the particle size of both the pregelatinized starch and the sugar there is unexpectedly and synergistically obtained the recited improved texture and appearance characteristics.

The pregelatinized starch employed in the dry instant pudding mix is of a type which is common in the pudding mix art. This can include chemically as well as physically modified pregelatinized starches from sources such as corn, waxy maize, tapioca, potato, etc. Critically the pregelatinized starch has a particle size wherein a maximum of 1% by weight of the starch is retained on a 230 mesh U.S. Standard screen and at least a majority by weight of the starch passes through a 400 mesh U.S. Standard screen. Preferably, the starch has a particle size wherein 55 to 80% by weight of the starch passes through a 400 mesh U.S. Standard screen. The controlled particle size of the starch in combination with the powdered sugar provide unexpected textural and appearance benefits as compared to a regular starch. A regular starch would generally have a particle size wherein less than 50% by weight of the starch particles pass through a 400 mesh U.S. Standard Screen, with substantial amount of the starch being retained on a 230 mesh U.S. Standard screen (e.g. greater than 10% by weight of the starch).

The sugar is also controlled to a critical particle size. The sugar incorporates a powdered sugar which has a particle size wherein at least 90% by weight of the sugar passes through a 200 mesh U.S. Standard Screen. This powdered sugar comprises from 5 to 60% by weight of the total sugar in the dry instant pudding mix. Preferably the powdered sugar is incorporated at a level of 15% to 40% by weight of the total sugar for increased textural and appearance benefits. The minimum effective level of sugar to obtain the textural and appearance benefits is 5% by weight of the total sugar, with 60% by weight of the total sugar being the maximum effective level of powdered sugar while still maintaining disperseability and without lumping of the dry pudding mix upon hydration. This powdered sugar in combination with the controlled particle size of the starch provides unexpected textural and appearance benefits in view of sugar commonly employed in dry instant pudding mixes which has a standard particle size, for example, sugar with 70% maximum by weight on a 60 mesh screen with 10% maximum by weight through a 100 mesh U.S. Standard screen and 0.5% maximum by weight through a 200 mesh U.S. Standard screen. The powdered sugar of the invention even provides substantial and unexpected benefits over a sugar with an intermediate particle size, as in U.S. Pat. No. 4,006,262, with the sugar having 85% minimum by weight through a 70 mesh screen with 35% maximum by weight on a 100 mesh U.S. Standard screen and 2% maximum by weight through a 200 mesh screen. The sugar can be from any source available in dry crystalline form, such as sucrose and dextrose.

The key ingredient in an instant pudding mix which affects the smoothness, creaminess and surface gloss of the pudding is the pregelatinized starch. A pregelatinized starch which is composed entirely of individual whole granules imparts the optimum smooth and creamy texture and glossy appearance. Pregelatinized starches which contain agglomerates or granule fractions pasted together impart a lower quality texture and less surface sheen. The agglomerates and different sized or jagged starch particles create a texture which is less smooth and creamy (compared to individual whole granules) and reflect light unevenly from the surface reducing glossiness.

This invention has discovered that the performance of pregelatinized starches (texture and appearance upon hydration) can be substantially improved by reducing the particle size of the starch so that very few large agglomerates are present with a substantial portion of the starch being at about the size of whole granules (about 20 to 75 microns). This creates an extremely large number of starch particles per unit weight. However, the number and size of the starch particles makes it difficult to rapidly and uniformly hydrate the instant dry pudding mix, which is necessary to achieve a uniform pudding. If all ingredients are not adequately dispersed, gel formation traps particles in the non-uniform areas. This invention through use of a powdered sugar is able to adequately disperse the starch particles. It is theorized that the powdered sugar disolves faster and provides a sufficient number of particles to effectively separate all the starch particles in the dry mix, allowing each starch particle to swell independently and uniformly rather than sticking to other nearby starch particles upon hydration. The combination of the fine starch plus the powdered sugar is critical to obtaining the improved texture and appearance while providing a dry instant pudding mix which will rapidly and uniformly disperse and hydrate.

The pudding mix of this invention contains levels of the various ingredients as are common in the art, for example: sugar at 25 to 85% (preferably 50 to 80%); pregelatinized starch at 5 to 25% (preferably 10 to 20%); setting agents at 1–5% (preferably 2–4%); flavor at 0 to 3%; optionally cocoa at 0 to 25%; and optionally fat at 0 to 20%, all percents being by weight of the total composition. The setting agents are preferably an alkali pyrophosphate and an alkali orthophosphate.

The instant pudding mix is prepared by mixing the pudding mix with milk and allowing the mixture to set. For example, about 100 grams of mix is mixed with 2 cups (473 ml) of milk. The mix rapidly and uniformly disperses and hydrates resulting in a pudding which possesses an optimum creamy, smooth and glossy texture. In addition to measuring these texture and appearance characteristics by expert and consumer evaluations, the following tests have been employed as detailed below.

To measure glossiness, a Photovolt Reflection Meter, Model 610, manufactured by Photovolt Corp. was employed. The pudding is first prepared by mixing 99 gms of the dry pudding mix with two cups (473 ml) of cold milk and blending in an electric mixer, then letting the pudding stand at room temperature to set. It is important to get a smooth flat pudding surface to obtain an accurate pudding gloss measurement. The pudding is placed under the meter and the photovolt reflection meter is lowered to the pudding surface as close as possible without actually touching the surface. Five readings are taken at different locations on the surface at 30 and 60 minutes, repeating each reading with a duplicate sample (total of 20 readings) and with a constant height setting for all puddings. The reflection meter operates on the principle of shining a light on a object surface and measuring the amount of reflected light received at a detector, with a higher reading indicating a glossier surface. The reflection meter readings were shown to correlate with eye measurements of gloss by a panel of experts. The reflection meter is commonly used in the paint, plastic and paper industries to measure surface light reflection.

A Haake Rotoviscometer, manufactured by Haake, Inc., 244 Saddle River Road, Saddle Brook, N.J., was used to measure pudding smoothness and quality. The puddings were prepared by mixing 99 gms of the dry pudding mix with 2 cups (473 ml.) of cold milk and blending in an electric mixer. Part of the pudding is poured into a tempering vessel at 9° C. After the pudding sets in the tempering vessel for one half hour the machine is turned on. The rotor that turns in the vessel turns from zero to 100 rpm in one minute. The first reading is taken and gives a curve of the viscosity profile. The machine is reset and a second run curve is taken which gives a reading after gel structure has broken down. Both curves are drawn with a higher percent rerun curve area (area of first curve divided by area of second curve×100) indicating the presence of very little lingering gel structure above complete breakdown which is a characteristic of better eating pudding quality (smoothness and creaminess). This type of response is characteristic of a highly desireable pleasant texture and correlates with evaluations by an expert panel. With the first curve a structural peak reading (area above a line extended from the flat portion of the right hand side of the curve divided by the total curve area×100) is also taken. A smaller percent structural peak (below 5%) indicates an increased smooth and creamy texture which is characteristic of better eating quality, and correlates with evaluations by an expert panel.

The following examples are meant for illustrative purposes only with the appended claims providing the definition of the invention.

EXAMPLE I

Six samples of pudding were prepared from a dry instant pudding mix by reconstituting 99.2 gms of the mix with 2 cups (473 ml) of cold milk (about 5° C.). The dry mix has the following formulation: sugar—77.7 gms; pregelatinized tapioca starch—16.0 gms; sodium phosphate—3.5 gms; salt 0.5 gms; mono and di-glycerides—0.5 gms; vegetable oil—0.4 gms; and flavor and color 0.6 gms. The only variation in the samples was the particle size of the starch and the sugar expressed as percent by weight, as follows:

Regular Sugar:
  on 40 mesh—7% max.
  on 60 mesh—70% max.
  through 100 mesh—10% max.
  through 200 mesh—0.5% max.
Intermediate Sugar:
  on 70 mesh—15% max.
  on 100 mesh—35% max.
  through 200 mesh—2% max.
Powdered Sugar:
  on 70 mesh—0.5% max.
  through 200 mesh—90% min.
Regular Starch:
  on 140 mesh—4% max.
  through 200 mesh—89% min.
  on 230 mesh—10% min.
  through 400 mesh—50% max.
Fine grind starch:
  on 230 mesh—1% max.
  through 400 mesh—55 to 80%

Each sample was evaluated by a panel of experts and are numbered according to their preference for the textural and appearance characteristics of the hydrated puddings (Sample 1—best, Sample 6—worst). Each sample was also evaluated for gloss on the Photovolt Reflection Meter and for pudding smoothness and quality of the Haake Rotoviscometer as detailed above.

| Sample | Type of Starch and sugar | Gloss Meter reading | % Rerun Curve Area | % Structural Peak |
|---|---|---|---|---|
| 1 | 40% powdered sugar, 60% regular sugar Fine grind starch | 65.1 | 63.7 | 2.67 |

-continued

| Sample | Type of Starch and sugar | Gloss Meter reading | % Rerun Curve Area | % Structural Peak |
|---|---|---|---|---|
| 2 | 15% powdered sugar, 85% regular sugar Fine grind starch | 63.6 | 61.6 | 2.46 |
| 3 | 15% powdered sugar, 85% regular sugar Regular starch | 61.6 | 61.6 | 4.21 |
| 4 | Intermediate sugar, Regular starch (see U.S. Pat. No. 4,006,262) | 60.1 | 60.8 | 4.42 |
| 5 | Regular sugar, Regular starch | 61.6 | 60.2 | 6.16 |
| 6 | Regular sugar, Fine grind starch | 60.3 | 63.9 | 3.94 |

The gloss meter, rerun curve and structural peak measurements substantially correlated with the judgements of a panel of experts which found that the combination of powdered sugar and fine grind starch produced a substantial and significant improvement in the highly glossy surface and improved creamy and smooth texture and eating quality over that of the other samples, including the regular starch and regular sugar, and even the intermediate grind sugar and regular starch.

The combination of powdered sugar and fine grind starch surprisingly produced an improved creamy and smooth texture and eating quality, as well as an improved highly glossy surface. The preference by the consumer for these improved textural characteristics were demonstrated in a consumer test wherein the consumer preferred the combination of powdered sugar and fine grind starch (as in sample 2) over regular sugar and regular starch (as in sample 5) by a significant 61% to 39% margin.

What is claimed is:

1. An improved, dry, instant pudding mix, which rapidly and uniformly disperses and hydrates to produce a pudding with improved smoothness, creaminess and glossy appearance, wherein the improved composition comprises:

a pregelatinized starch component, which is 5 to 25% by weight of the pudding mix, and consists of individual whole granules wherein, a maximum of 1% by weight of the starch is retained on a 230 mesh U.S. Standard screen, and at least a majority by weight of the starch particles pass through a 400 mesh U.S. Standard screen;

a sugar component, which is 25 to 85% by weight of the pudding mix, wherein 5 to 60% by weight of the sugar component is a powdered sugar having a particle size distribution wherein at least 90% by weight of the sugar particles pass through a 200 mesh U.S. Standard screen; and a setting agent component, which is between 1 and 5% by weight of the pudding mix.

2. Pudding mix of claim 1 wherein the level of the powdered sugar is within the range of 15 to 40% by weight of the total sugar.

3. Pudding mix of claim 1 wherein the starch has a particle size wherein 55 to 80% by weight of the starch passes through a 400 mesh U.S. standard screen.

4. Pudding mix of claim 1 wherein the setting agents are an alkali pyrophosphate and an alkali orthophosphate.

5. A process for preparing an instant pudding comprising mixing the pudding composition of claims 1, 2 or 3 with milk and allowing the mixture to set.

* * * * *